A. E. BAKER.
Piston-Packings.

No. 147,543. Patented Feb. 17, 1874.

WITNESSES,

Edwin E. Pierce

Thomas F. Cosgrove

INVENTOR,

Augustus E. Baker

UNITED STATES PATENT OFFICE.

AUGUSTUS E. BAKER, OF PROVIDENCE, RHODE ISLAND.

IMPROVEMENT IN PISTON-PACKINGS.

Specification forming part of Letters Patent No. 147,543, dated February 17, 1874; application filed July 26, 1873.

*To all whom it may concern:*

Be it known that I, AUGUSTUS E. BAKER, of the city and county of Providence, in the State of Rhode Island, have invented certain new and useful Improvements in Piston-Packings; and I do hereby declare that the following specification, taken in connection with the drawings making a part of the same, is a full, clear, and exact description thereof.

My invention relates to that class of piston-packings in which the packing-rings are distended against the surface of the cylinder by the direct pressure of the steam.

Figure 4:
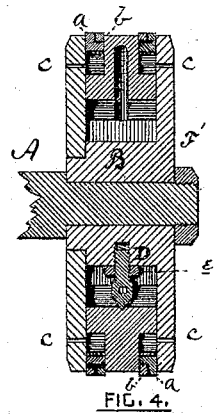

A in the several figures represents the piston-rod, which is secured to a four-arm saw-buck or other equivalent shaped head, B, and circular plate F'. C is the chunk-ring, which is combined with the central head B by means of a pointed holding-screw, D, hereafter to be referred to. The chunk-ring is furnished with two sets of expanding-rings, one for each side of the piston. Each set of rings is made up of two members, (rings broken at one point only,) $a$ and $b$, shown in section at Fig. 4, which, together, make a continuous ring, but the member $a$ is lipped so as to receive the member $b$, Fig. 4, and the joint in each member is covered by the other member, the two members being doweled together, so that as a whole the packing-ring may turn around the chunk-ring, but the relation of the two parts of the ring to each other will not be thereby changed. Upon both sides of the chunk-rings recesses or chambers E are made, within which recesses springs are placed so as to press the packing-rings outward against the surface of the cylinder; but the springs are not relied on to effect a tight joint, but are intended merely to keep the rings at all times bearing against the cylinder.

It will be noticed that the springs $s$ are so shaped as not to interfere with the packing-rings turning around the chunk-ring, and it is intended that the rings shall be free to be constantly slowly revolving around the chunk-ring for the purpose of diminishing the tendency of them to wear away unevenly.

Figure 1:
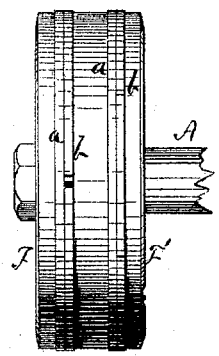
Figure 2:
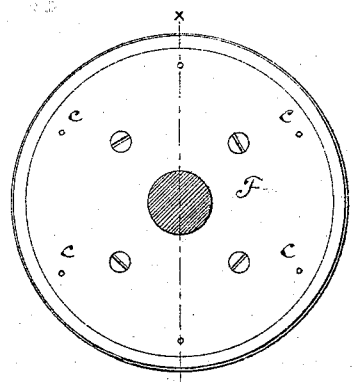
Figure 3:
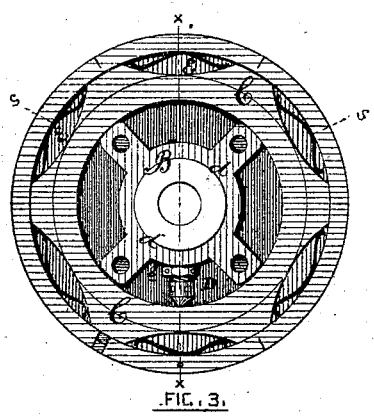

The front face of the piston is covered with a cap, F, Fig. 2, secured by screw-bolts to the head B, and the other face by the plate F', to which the head B is cast, and through which cap and plate holes $c$ are made for the admission of steam alternately to the chambers E on opposite sides of the piston for pressing out the packing-rings to make a tight joint with the interior surface of the cylinder.

From the foregoing description, it will be understood that although the packing-rings appropriate to each side of the piston are pressed outward by the direct action of the steam, the rings themselves are free to move around the chunk-ring, and the said rings, being composed of two members, $a$ and $b$, constructed and arranged relative to each other, as described, it is impossible, if the piston is properly constructed, for the steam to blow through from one side to the other.

The head B is combined with the chunk-ring by means of the pointed holding-screw D and nut $e$. The length of the opposite radial arms $d$ of the head B is less than the diameter of the circular recess G in the chunk-ring which receives the said head, and by slackening the screw D the chunk-ring can be adjusted to a new position, relatively to the head B, and the two again secured together by entering the point of D in another socket-hole. This arrangement is of advantage in making a nice adjustment of the piston to the cylinder and the stuffing-box of the front head.

What I claim as my invention, and desire to secure by Letters Patent, is—

1. Expansible packing-rings $a\ b$, in combination with a chunk-ring, C, provided with chambers E, when such packing-rings are arranged to turn around the chunk-ring, substantially as described.

2. The combination of the head B, recessed chunk-ring C, and holding-screw D, substantially as described.

AUGUSTUS E. BAKER.

Witnesses:
EDWIN C. PIERCE,
THOMAS F. COSGROVE.